United States Patent
Chavez (10) Patent No.: US 7,260,557 B2
(45) Date of Patent: Aug. 21, 2007

(54) METHOD AND APPARATUS FOR LICENSE DISTRIBUTION

(75) Inventor: David L. Chavez, Thornton, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 759 days.

(21) Appl. No.: 10/377,369

(22) Filed: Feb. 27, 2003

(65) Prior Publication Data

US 2004/0172367 A1    Sep. 2, 2004

(51) Int. Cl.
G06F 99/00 (2006.01)
H04K 1/00 (2006.01)

(52) U.S. Cl. .................... 705/59; 705/55; 705/28; 714/4

(58) Field of Classification Search .............. 705/59, 705/28, 4
See application file for complete search history.

(56) References Cited

U.S. PATENT DOCUMENTS

| | | | | |
|---|---|---|---|---|
| 4,288,659 A | 9/1981 | Atalla | ................ | 178/22.08 |
| 4,780,821 A | 10/1988 | Crossley | | |
| 4,811,393 A | 3/1989 | Hazard | ................ | 380/21 |
| 4,888,800 A | 12/1989 | Marshall et al. | ............ | 380/21 |
| 4,937,863 A | 6/1990 | Robert et al. | | |
| 5,157,663 A | 10/1992 | Major et al. | | |
| 5,179,591 A | 1/1993 | Hardy et al. | ............ | 380/21 |
| 5,204,897 A | 4/1993 | Wyman | ............ | 380/4 |
| 5,206,903 A | 4/1993 | Kohler et al. | | |
| 5,230,020 A | 7/1993 | Hardy et al. | ............ | 380/21 |
| 5,260,999 A * | 11/1993 | Wyman | ............ | 705/59 |
| 5,307,481 A | 4/1994 | Shimazaki et al. | | |
| 5,329,570 A | 7/1994 | Glassmacher et al. | ...... | 379/189 |
| 5,341,427 A | 8/1994 | Hardy et al. | ............ | 380/21 |
| 5,386,369 A | 1/1995 | Christiano | | |
| 5,390,297 A | 2/1995 | Barber et al. | | |
| 5,408,649 A | 4/1995 | Beshears et al. | | |
| 5,448,639 A | 9/1995 | Arazi | | |
| 5,553,143 A | 9/1996 | Ross et al. | | |
| 5,563,946 A | 10/1996 | Cooper et al. | | |
| 5,671,412 A | 9/1997 | Christiano | | |
| 5,699,431 A | 12/1997 | Van Oorschot et al. | ...... | 380/30 |
| 5,708,709 A | 1/1998 | Rose | ............ | 705/59 |
| 5,717,604 A | 2/1998 | Wiggins | ............ | 709/229 |

(Continued)

FOREIGN PATENT DOCUMENTS

EP    1 071 253 A1    1/2001

OTHER PUBLICATIONS

U.S. Appl. No. 10/947,418, filed Sep. 21, 2004, Gilman et al.

(Continued)

Primary Examiner—Firmin Backer
(74) Attorney, Agent, or Firm—Sheridan Ross P.C.

(57) ABSTRACT

A method and apparatus for license distribution are disclosed. An endpoint requests information from a server related to information required for the server to grant a license. The server provides the required information to the endpoint. The endpoint obtains the required information, and forwards the information to the server. The server, upon receiving the information, determines if a license may be granted to the endpoint, and transmits a license authorization to the endpoint, which includes the number of licenses which are granted.

25 Claims, 7 Drawing Sheets

U.S. PATENT DOCUMENTS

| | | | |
|---|---|---|---|
| 5,742,757 A | 4/1998 | Hamadani et al. | |
| 5,745,576 A | 4/1998 | Abraham et al. | 380/25 |
| 5,745,879 A | 4/1998 | Wyman | 705/1 |
| 5,758,068 A | 5/1998 | Brandt et al. | 726/27 |
| 5,758,069 A | 5/1998 | Olsen | |
| 5,790,074 A | 8/1998 | Rangedahl et al. | 342/357.13 |
| 5,790,664 A | 8/1998 | Coley et al. | 380/4 |
| 5,828,747 A | 10/1998 | Fisher et al. | |
| 5,905,793 A | 5/1999 | Flockhart et al. | |
| 5,905,860 A | 5/1999 | Olsen et al. | 395/187.01 |
| 5,940,504 A | 8/1999 | Griswold | 705/59 |
| 5,960,085 A | 9/1999 | de la Huerga | |
| 5,978,565 A | 11/1999 | Ohran et al. | |
| 5,982,873 A | 11/1999 | Flockhart et al. | |
| 6,011,973 A | 1/2000 | Valentine et al. | 455/456.6 |
| 6,023,766 A | 2/2000 | Yamamura | |
| 6,067,621 A | 5/2000 | Yu et al. | |
| 6,108,703 A | 8/2000 | Leighton et al. | 709/226 |
| 6,134,660 A | 10/2000 | Boneh et al. | |
| 6,148,415 A | 11/2000 | Kobayashi et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,502,079 B1 | 12/2002 | Ball et al. | 705/59 |
| 6,513,121 B1 | 1/2003 | Serkowski | 713/201 |
| 6,574,612 B1 | 6/2003 | Baratti et al. | |
| 6,584,454 B1 | 6/2003 | Hummel et al. | |
| 6,765,492 B2 | 7/2004 | Harris | 340/686.6 |
| 6,775,782 B1 | 8/2004 | Buros et al. | |
| 6,778,820 B2 | 8/2004 | Tendler | 455/414.2 |
| 6,826,606 B2 | 11/2004 | Freeman et al. | 709/223 |
| 6,850,958 B2 | 2/2005 | Wakabayashi | |
| 6,854,010 B1 | 2/2005 | Christian et al. | |
| 6,883,095 B2 | 4/2005 | Sandhu et al. | |
| 6,920,567 B1 | 7/2005 | Doherty et al. | 726/22 |
| 6,928,166 B2 | 8/2005 | Yoshizawa | |
| 6,928,558 B1 | 8/2005 | Allahwerdl et al. | |
| 6,934,848 B1 | 8/2005 | King et al. | |
| 6,976,164 B1 | 12/2005 | King et al. | |
| 7,032,113 B2 | 4/2006 | Pendlebury | |
| 7,085,382 B2 | 8/2006 | Terao et al. | |
| 7,100,200 B2 | 8/2006 | Pope et al. | |
| 2001/0013024 A1 | 8/2001 | Takahashi et al. | |
| 2002/0001302 A1 | 1/2002 | Pickett | 370/352 |
| 2002/0017977 A1 | 2/2002 | Wall | 340/5.28 |
| 2002/0038422 A1 | 3/2002 | Suwamoto et al. | |
| 2002/0052939 A1 | 5/2002 | Lee | |
| 2002/0083003 A1 | 6/2002 | Halliday | 705/52 |
| 2002/0087892 A1 | 7/2002 | Hideyo | |
| 2002/0107809 A1* | 8/2002 | Biddle et al. | 705/59 |
| 2002/0112186 A1 | 8/2002 | Ford et al. | |
| 2002/0125886 A1 | 9/2002 | Bates et al. | 324/307 |
| 2002/0154777 A1 | 10/2002 | Candelore | 380/258 |
| 2002/0164025 A1 | 11/2002 | Raiz et al. | 380/231 |
| 2002/0174356 A1 | 11/2002 | Padole et al. | 713/200 |
| 2002/0176404 A1 | 11/2002 | Girard | 370/352 |
| 2002/0188856 A1 | 12/2002 | Patton et al. | |
| 2003/0005427 A1 | 1/2003 | Herrero | 717/178 |
| 2003/0013411 A1 | 1/2003 | Uchlyama | |
| 2003/0055749 A1* | 3/2003 | Carmody et al. | 705/28 |
| 2003/0144959 A1 | 7/2003 | Makita | |
| 2003/0149874 A1 | 8/2003 | Balfanz et al. | |
| 2003/0208449 A1 | 11/2003 | Diao | |
| 2004/0073517 A1 | 4/2004 | Zunke et al. | 705/59 |
| 2004/0078339 A1* | 4/2004 | Goringe et al. | 705/59 |
| 2004/0103324 A1 | 5/2004 | Band | |
| 2004/0162998 A1 | 8/2004 | Tuomi et al. | |
| 2004/0166878 A1 | 8/2004 | Erskine et al. | 455/456.1 |
| 2004/0172367 A1 | 9/2004 | Chavez | 705/59 |
| 2004/0181695 A1 | 9/2004 | Walker | 713/202 |
| 2004/0181696 A1 | 9/2004 | Walker | 713/202 |
| 2004/0199760 A1 | 10/2004 | Mazza | 713/150 |
| 2004/0260589 A1* | 12/2004 | Varadarajan et al. | 705/8 |
| 2005/0086174 A1* | 4/2005 | Eng | 705/59 |
| 2005/0202830 A1 | 9/2005 | Sudit | 455/456.1 |
| 2005/0246098 A1 | 11/2005 | Bergstrom et al. | 701/213 |
| 2006/0036894 A1* | 2/2006 | Bauer et al. | 714/4 |
| 2006/0178953 A1* | 8/2006 | Aggarwal et al. | 705/28 |
| 2006/0242083 A1 | 10/2006 | Chavez | |

OTHER PUBLICATIONS

U.S. Appl. No. 10/811,412, filed Mar. 25, 2004, Walker.

ADTech Engineering, "IP Phone SI-160 User Manual (SCCP releases)," Version 1.2 (2002), pp. 1-20.

Articsoft Limited, "Public Key Infrastructure (PKI) FAQs" (Feb. 2, 2003), available at http://www.articsoft.com/wp_pki_faq.htm, 5 pages.

ARSYS, "Public Key Infrastructure," (Feb. 4, 2001), available at http://www.transactiontrust.com/technicaindex.html, 4 pages.

Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.

Datakey, "Securing a Virtual Private Network with Smart Card Technology" available at www.datakey.com, pp. 1-8.

"Digital Cinema Key Management Messages," Draft 1 (Aug. 8, 2002), pp. 1-9.

Discerning the Times Digest and Newsbytes, "Global Control of All Buying and Selling Now Possible," vol. 1, Iss. 1 (Jan. 2000), available at http://www.discerningtoday.org/members/Digest/2000Digest/January/Global%20Control.htm, 2 pages.

Info Merchant Store, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.

Griswold, Robert S., "Get Smart: The Coming Revolution of Smart Cards," *Journal of Property Management* (May/Jun. 1997), 5 pages.

Entrust Inc., "Entrust Authority Security Manager," (printed Aug. 13, 2004), available at http://www.entrust.com/authority/manager/index.htm, 23 pages.

Infosec Engineering, "Building a Corporate Public Key Infrastructure" (1999), available at http://www.infoseceng.com/corppki.htm, 20 pages.

LockStream Corporation, "Catalyst DRM Service Platform Architecture," Vers. 1.0 (Nov. 2003), pp. 1-28.

LockStream Corporation, "Catalyst DRM Service Platform" (printed Aug. 13, 2004), available at http://www.lockstream.com/products_spcm.php, 1 page.

LockStream Corporation, "Lockstream KeyDRM" (printed Aug. 13, 2004), available at http://www.lockstream.com/products_lgm.php, 2 pages.

LockStream Corporation, "Lockstream OMA 1.0 DRM Client" (printed Aug. 13, 2004), available at http://www.lockstream.com/products_sprm.php, 2 pages.

Microsoft Corporation, "Accessing a Smart Card" (Aug. 2002), available at http://msdn.microsoft.com/library/en-us/security/security/accessing_a_smart_card.asp, p. 1.

Microsoft Corporation, "Base Service Providers" (Aug. 2002), available at http://msdn.microsoft.com/library/en-us/security/security/base_services_providers.asp, p. 1.

Microsoft Corporation, "Building an ISO7816-4 APDU Command" (Aug. 2002), available at http://msdn.microsoft.com/library/en-us/security/security/building_an_iso7816_4_apdu_command.asp, pp. 1-2.

Microsoft Corporation, "Introducing Smart Cards to the System" (Aug. 2002), available at http://msdn.microsoft.com/library/en-us/security/security/introducing_smart_cards_to_the_system.asp, p. 1.

Microsoft Corporation, "Primary Service Provider" (Aug. 2002), available at http://msdn.microsoft.com/library/en-us/security/security/primary_service_provider.asp, p. 1.

Microsoft Corporation, "Smart Card Authentication" (Aug. 2002), available at http://msdn.microsoft.com/library/en-us/security/security/smart_card_authentication.asp, pp. 1-2.

Microsoft Corporation, "Smart Card Interfaces" (Aug. 2002), available at http://msdn.microsoft.com/library/en-us/security/security/smart_card_interfaces.asp, p. 1.

Microsoft Corporation, "Smart Card Resource Manager" (Aug. 2002), available at http://msdn.microsoft.com/library/en-us/security/security/smart_card_resource_manager.asp, p. 1.

Microsoft Corporation, "Smart Card User Interface" (Aug. 2002), available at http://msdn.microsoft.com/library/en-us/security/security/smart_card_user_interface.asp, p. 1.

Microsoft Corporation, "Smart Card Service Providers" (Aug. 2002), available at http://msdn.microsoft.com/library/en-us/security/security/smart_card_service_providers.asp, p. 1.

Microsoft Corporation, "Vendor Wrapper Service Provider" (Aug. 2002), available at http://msdn.microsoft.com/library/en-us/security/security/vendor_wrapper_service_provider.asp, pp. 1-2.

MIT Laboratory for Computer Science, "The Cricket Indoor Location System," An NMS Project (printed Jul. 31, 2002), available at http://nms.lcs.mit.edu/projects/cricket/, 5 pages.

Motorola Press Release, "ERG Motorola Alliance Receives Award for Smart Card" (Jun. 6, 2000), available at http://www.motorola.com/LMPS/pressreleases/page888.htm, 3 pages.

NEC Infrontia Corporation Press Release, "Establishment of "SmartCardInfrontia" solutions for 'IC card'," (Mar. 13, 2002), 4 pages.

Novell®, "Certificate Server: Public Key Instrastructure," White Paper (1999), pp. 1-10.

SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.

Smart Card Alliance Industry News, "Cubic Introduces New Mobile Ticketing Machine" (Jul. 3, 2003), available at http://www.smartcardalliance.org/industry_news/industry_news_item.cfm?itemID=852, 2 pages.

Smart Card Alliance Industry News, "Cubic Corp. Introduces New National Security and Homeland Defense" (Sep. 9, 2002), available at http://www.smartcardalliance.org/industry_news/industry_news_item.cfm?itemID=310, 2 pages.

SSH Communications Security Corp., "Enabling Virtual Public Networks with Public Key Infrastructure," White Paper (Jan. 2004), pp. 1-9.

Streetman, Kibbee D. et al., "Public Key Infrastructure: Resources, Requirements and Recommendations," ATI IPT Special Report 00-06 (Apr. 2000), pp. 1-45.

Sun Developer Network, "Smart Card Overview," Sun Microsystems, Inc. (1994-2004), available at http://java.sun.com/products/javacard/smartcards.html, 2 pages.

NetLingo Dictionary of Internet Words, "Smart Card" (1995-0004), available at http://www.netlingo.com/lookup.cfm?term=smart+card, 2 pages.

Rankl, Wolfgang, "Smart Card Handbook," (Jun. 13, 2004), available at http://www.wrankl.de/SCH/SCH.html, 8 pages.

Russinovich, Mark, "Inside Encrypting File System, Part 1," *Windows & NET Magazine* (Jun. 1999), available at http://www.winntmag.com/Articles/Index.cfm?ArticleID=5387&Key=Internals, 4 pages.

Russinovich, Mark, "Inside Encrypting File System, Part 2," *Windows & NET Magazine* (Jul. 1999), available at http://www.winntmag.com/Articles/Index.cfm?ArticleID=5592&Key=Internals, 5 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target Search™, "PKI" (Jan. 13, 2004), available at http://whatis.techtarget.com/definition/0.289893.sid9_gci214299.00.html, 4 pages.

U.S. Appl. No. 10/775,498, Gilman.

U.S. Appl. No. 10/956,861, Robinson.

U.S. Appl. No. 11/051,316, Mazza.

U.S. Appl. No. 10/232,507, filed Aug. 30, 2002, Serkowski et al.

U.S. Appl. No. 10/231,957, filed Aug. 30, 2002, Serkowski et al.

U.S. Appl. No. 10/232,508, filed Aug. 30, 2002, Rhodes et al.

U.S. Appl. No. 10/232,906, filed Aug. 30, 2002, Walker et al.

U.S. Appl. No. 10/231,999, filed Aug. 30, 2002, Walker et al.

U.S. Appl. No. 10/232,647, filed Mar. 30, 2002, Walker et al.

U.S. Appl. No. 10/278,504, filed Oct. 22, 2002, Goringe et al.

U.S. Appl No. 10/348,107, filed Jan. 20, 2003, Walker et al.

\* cited by examiner

METHOD AND APPARATUS FOR LICENSE DISTRIBUTION

FIELD OF THE INVENTION

The present invention relates generally to the licensing and copy protection of software and video material, more specifically, to portability and distribution of enterprise wide licenses and licenses for copying of software and video material.

BACKGROUND OF THE INVENTION

To protect software manufacturers' intellectual property rights in software sold to the public, manufacturer's commonly license software to the purchaser. Additionally, in many applications the purchaser has purchased a large number of licenses, commonly referred to as rights to use (RTUs), which are used across many different sites in an enterprise. In particular, a customer may purchase a number of licenses for a release or version of a particular software package for a customer premise telecommunication switching system. Many times the customer also has an enterprise network which includes telecommunication switching systems located at several different sites. Rather than purchase licenses for each individual site, it is often more cost effective to purchase all of the licenses for all of the sites in a bulk package. The licenses may be used across various sites where different telecommunication switching systems are used. In certain instances a customer may need to change the number of licenses for particular sites. For example, a company may initially require 1000 licenses at site A, and 2000 licenses at site B. Due to personnel shifts, the company may later require 500 licenses at site A, and 2500 licenses at site B. Portability of licenses between different sites for an organization is known as "enterprise wide licensing" or "EWL." EWL may also be advantageous for balancing loads at different sites. For example, an enterprise may have three telecommunications switches and thirty total licenses which are initially distributed as ten licenses per switch. It may then be determined that one of the switches has a heavier volume than the other two, and it would be useful to have additional licenses at that site. In such a case, efficient EWL would be advantageous.

Traditionally, number of licenses available at a site, after the initial license distribution, had to be manually adjusted, which commonly involved contacting the software distributor and obtaining the adjustment of the licenses. This also typically required a technician from the software distributor to visit the sites to install files which allow for the adjusted number of licenses. Thus, it would be advantageous for such a customer to have portability of the licenses, allowing them to automatically adjust the number of licenses available for any given site without requiring the installation of separate files, and without requiring a service call from a technician. As is known, the number of licenses simply indicates the total number of copies of the software package which may be operated at a given time. Accordingly, the licenses control the number of copies of the software package which are available at any given time. Thus, the control of licenses may also be viewed as controlling the number of copies of a software package.

A similar type of problem is present in the high definition digital video content industry. In this case, a content provider which provides high definition digital content needs to limit the available copying of that digital content. Many content providers, such as broadcast television content providers, are required to allow for fair use copying, such as copying for time-shift purposes, but want to limit other copying. This problem is particularly important for devices which are able to digitally record the digital content. In such cases, there is no deterioration in quality for the copy, and additional copies may be made with no deterioration. Accordingly, there is a large piracy concern for such digital content communication.

Traditionally, two schemes have been commonly used to protect content providers from unauthorized copying. One scheme, known as Macrovision™, provides an inherent instability within the picture. When the picture goes through an analog conversion, the instability becomes apparent, degrading the picture. However, this scheme only works if the copying is performed using an analog conversion. As digital recording technology advances, digital recording mediums and hardware to record digitally are become more common. Thus, this scheme will not be effective against copying which is performed using a digital recording medium.

A second scheme is a software restriction on digital transfer of high definition picture. One such method is known as 1080i, which is a digital transmission format defined by the Advanced Television Systems Committee. Embedded in the 1080i digital transmission is an identified transmission quality of picture. This embedded digital encoding is picked up at the receiver, which determines if the transmission is copy protected. While this method can be effective in allowing copying or not allowing copying, it is not flexible with respect to the amount of copying allowed for certain content. For example, in many cases a content provider may need to allow copies of certain content for fair use time-shift purposes. Using this method, if copying of the content is allowed, additional copies may be made following the recording of the original copy. Accordingly, it would be useful to have a system which would allow a single fair use copy, or limited fair use copies, to be made of such content, and limit any additional copies which are made of the content.

Another method to limit copying of content is known as IEEE1394 or "Firewire." If picture is copy encoded, it is trusted that the receiver will not allow a copy to be made. If the receiver is an original source (i.e. a personal video recorder or "PVR"), a limit on the copies may be given. However, a drawback of this method is that pirates can defeat the digital copy encoding in a relatively simple manner, by locating the information containing the permitted copying information and altering this information to allow for unlimited copies. For example, if a Digital Video Disk (DVD) contains information related to permissible copying of the digital content, a pirate may locate the area on the surface of the disk which contains this information. The pirate may then alter that area such that the information cannot be read, which results in copies being able to be made.

In order to attempt to limit unauthorized copying, content providers may also encrypt the signal. In such a case, the pirate may also defeat the encryption. While encryption is somewhat effective, it requires that encryption keys be distributed in a secure manner. Decoding the encryption also degrades the performance of a video system, and can potentially cause a fault if there is an error in the decryption. Thus, it would be advantageous to provide a method for copy protection which does not rely on copy encoding data in the digital content, and does not require encryption.

Another method for limiting copying of digital content is a failed technology known as DIVX. This technology required a digital player which contacted, via a telephone connection, a center which granted permission to view the digital content. This technology was not successful and raised a number of privacy concerns, as people did not want it to be recorded every time they viewed a movie. Furthermore, permission was required from the authorization source any time the product was viewed. Thus, unlimited copies of the digital content could be made, and the content only viewed upon the grant of permission by the authorization center. This had the effect of removing any incentive for a producer to make any copies of such content, because the content could be copied freely, and an end user would simply pay when the content was actually viewed. Thus, it would be advantageous to provide a copy protection system which maintains incentive for producers to manufacture copies of digital content.

Another problem area in software and digital content distribution may occur following the distribution of the software or some digital content. Following this distribution, it may be determined that the software or digital content violates a law or some rights of another owner. In the event that such a situation arises, it would be advantageous to limit the amount of additional copying which may be done for the software or digital content. For example, a first customer may purchase 10,000 licenses for telecommunications switching software and divide the number of licenses between two sites, with each site receiving 5000 licenses. The license purchase agreement may specify that the customer is to pay the software distributor an amount of $10,000 per month for one year. If the customer then fails to pay the software distributor, it would be advantageous to provide a solution which does not allow the customer to move copies of the software between the sites. Thus, if the customer in this example, after failing to pay the license fee, wishes to move 1,000 licenses from the first site to the second site, it would be useful to the software distributor to be able to deny the movement of the licenses until proper payment is made. Similarly, if a digital content provider determines that the content which is distributed violates an intellectual property right, it would be useful for the content provider to deny any additional copies of the content from being made. For example, a content provider may distribute a movie in digital format, and later discover that a scene in the movie contains a copyrighted image which the copyright owner demands not be reproduced. In such a case, if the content provider cannot resolve the dispute with the copyright owner, it would be useful to deny that any additional copies of the content be made, thus limiting the amount of damages to the copyright owner.

Accordingly, it would be advantageous to have a mechanism which provides copy protection for software and digital content while not inhibiting authorized use. It would also be advantageous for the mechanism to not require encryption, and which also does not require transmission of information every time a customer views the content.

SUMMARY OF THE INVENTION

These and other needs are addressed by the various embodiments and configurations of the present invention. The invention provides a method and apparatus for license distribution. An endpoint requests information from a server related to information required for the server to grant a license. The server provides the information to the endpoint. The endpoint obtains the required information, and forwards the information to the server. The server, upon receiving the information, determines if a license may be granted to the endpoint, and transmits a license authorization to the endpoint, which includes the number of licenses which are granted.

In accordance with one embodiment, a method for transferring a license in an enterprise network is provided. The method includes allocating a first number of licenses to a first site, and allocating a second number of licenses to a second site, the first and second sites being geographically dislocated from each other. A license reallocation request is received, and at least one of a third number of licenses for the first site and a fourth number of licenses for the second site is determined, without input from a user. A first response is communicated to the first site which includes the third number of licenses, and a second response is communicated to the second site which includes the fourth number of licenses. Following the response steps, the first and second sites are operated subject to the first site being entitled to the third number of licenses and the second site being entitled to the fourth number of licenses.

The method of this embodiment may also include updating a record indicating the third and fourth number of licenses allocated to the first and second sites, respectively. The record may be updated by accessing a database containing license records, and updating the records to indicate the third and fourth number of licenses allocated to said first and second sites, respectively. The database is accessed, in one embodiment, by establishing communication with a server, and accessing the database on the server which contains said license allocation records.

When making the determination of the third and fourth number of licenses the method, in one embodiment, includes calculating a difference between the first number and a requested number of licenses in the reallocation request, determining an additional number of licenses required for the first site based on the calculated difference, determining the third number of licenses as the sum of the first number and the additional number of licenses, and determining the fourth number by subtracting the additional number of licenses from the second number. In another embodiment, the determination includes accessing a database containing license allocation records to determine the first number and the second number, calculating a difference between the first number and the requested number of licenses in the reallocation request, determining an additional number of licenses required for the first site based on the calculated difference, and determining the fourth number by subtracting the additional number of licenses from the second number. When accessing the database, in one embodiment, a server is accessed by establishing communication with the server, and the database on the server is accessed to obtain the license allocation records.

The first response, in one embodiment, includes a number of fields, including a version number field, a customer name field, a number of licenses granted field, a use allowed field, and a qualifying field. The license reallocation request may also include a number of fields, including a version number field, a customer name field, a number of licenses requested field, and an authorization field.

The receiving and communicating may be performed using a number of protocols, including hypertext transfer protocol (http), and hypertext transfer protocol over secure socket layer (https).

The present invention also includes, in an embodiment, a method for copying digital content by a digital content server. The method includes the steps of displaying digital content, and receiving from a user a request to copy the digital content. Upon receiving the request, a server is accessed, with the server being geographically dislocated from the digital content receiver. The digital content receiver receives, from the server, a request for license information related to requirements for granting a license to copy digital content. The requested license information is determined, and communicated to the server. A copy license is received from the server, with the license including a number of copies which are authorized to be made. A copy of the digital content is generated when the number of copies included in the license is greater than zero. In one embodiment, the digital content receiver has no limitations regarding the viewing of the digital content. The requested license information, in one embodiment, includes several information fields including a content name field, a customer name field, a number of copies requested field, and a payment field. The payment field may include a requirement for credit card information. In one embodiment, the copy license includes a number of information fields, including a content name field, a customer name field, a number of licenses granted field, a use allowed field, and a qualifying field. The qualifying field may include authentication information, and/or a decryption key. In one embodiment, communication to and from the server is performed using hypertext transfer protocol or hypertext transfer protocol over secure socket layer. The copy is generated, in one embodiment, by verifying that the number of copies is greater than zero, verifying that a valid qualifying field is present, generating a copy of the digital content, and decrementing the number of copies.

The present invention includes, in another embodiment, a method for granting a license to copy digital content. The method includes the steps of, receiving, from a digital content receiver, a request for license information fields; communicating the license information fields to the digital content receiver over a network connection; receiving license information from the digital content recorder over the network connection; determining the availability of a copy license based on the license information; and communicating a license, including a number of copies which the digital content receiver is authorized to make, to the digital content receiver over the network connection. In one embodiment, the determining step includes verifying copy license availability for a content title requested to be copied, verifying proper payment, and determining the number of copies based on the payment and copy license availability. In another embodiment, the determining step includes accessing a database containing copy license permissions to determine if copy licenses are available for the requested digital content, verifying proper payment, and determining the number of copies based on the payment and copy license availability. The database may be accessed by establishing communication with a server, and accessing a database on the server which contains the copy license availability. The license information fields may include a number of fields, including a content name field, a customer name field, a number of licenses requested field, and a payment field. The copy license may include a number of fields, including a content name field, a customer name field, a number of licenses granted field, a use allowed field, and a qualifying field. The qualifying may contain authentication information and/or a decryption key. The receiving and communicating steps in one embodiment, are performed using hypertext transfer protocol, or hypertext transfer protocol over secure socket layer.

These and other advantages and features of the invention will become apparent from the following description of the invention taken together with the drawings.

DETAILED DESCRIPTION

Figure 1:
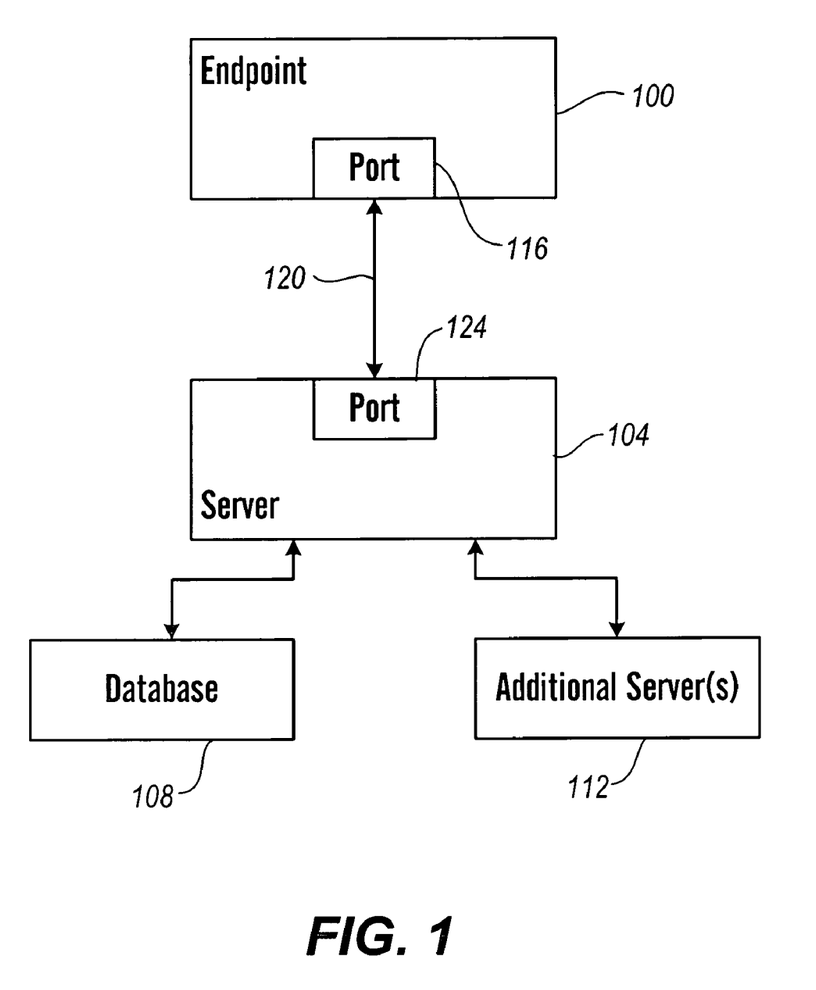
FIG. 1 is a block diagram illustration of a copy protection system of one embodiment of the present invention.

Referring first to FIG. 1, a block diagram illustration of a copy protection system of one embodiment of the present invention is described. An endpoint 100 is in communication with a server 104. The endpoint 100 may be an individual site for an enterprise software customer, and the endpoint 100 may likewise be a piece of equipment capable of recording digital content. The server 104 may be associated with a software distributor or a content provider. The server 104 communicates with a database 108, and additional server(s) 112 as may be required. The endpoint 100 may communicate with the server 104 in any of a number of ways. In the embodiment of FIG. 1, the endpoint 100 has a port 116 which communicates over a network connection 120 to a port 124 in the server. The network connection 120 may be any number of well known connections. For example, the network connection 120 may include the Internet. In this case, the endpoint port 116, and the server port 124, include Internet connections, and the network connection 120 is the Internet. The network connection 120 may also be a telephone connection, with the ports 116, 124 being modems. Furthermore, the endpoint 100 and server 104 may be components of a LAN, in which case the network connection 120 would be a standard LAN connection. In another embodiment, the endpoint 100 is a personal computer which is used to access the server 104 through an Internet connection. A user at the personal computer access a web page from the server 104, and enters information in order to obtain access codes which will allow for a license transfer.

Figure 2:
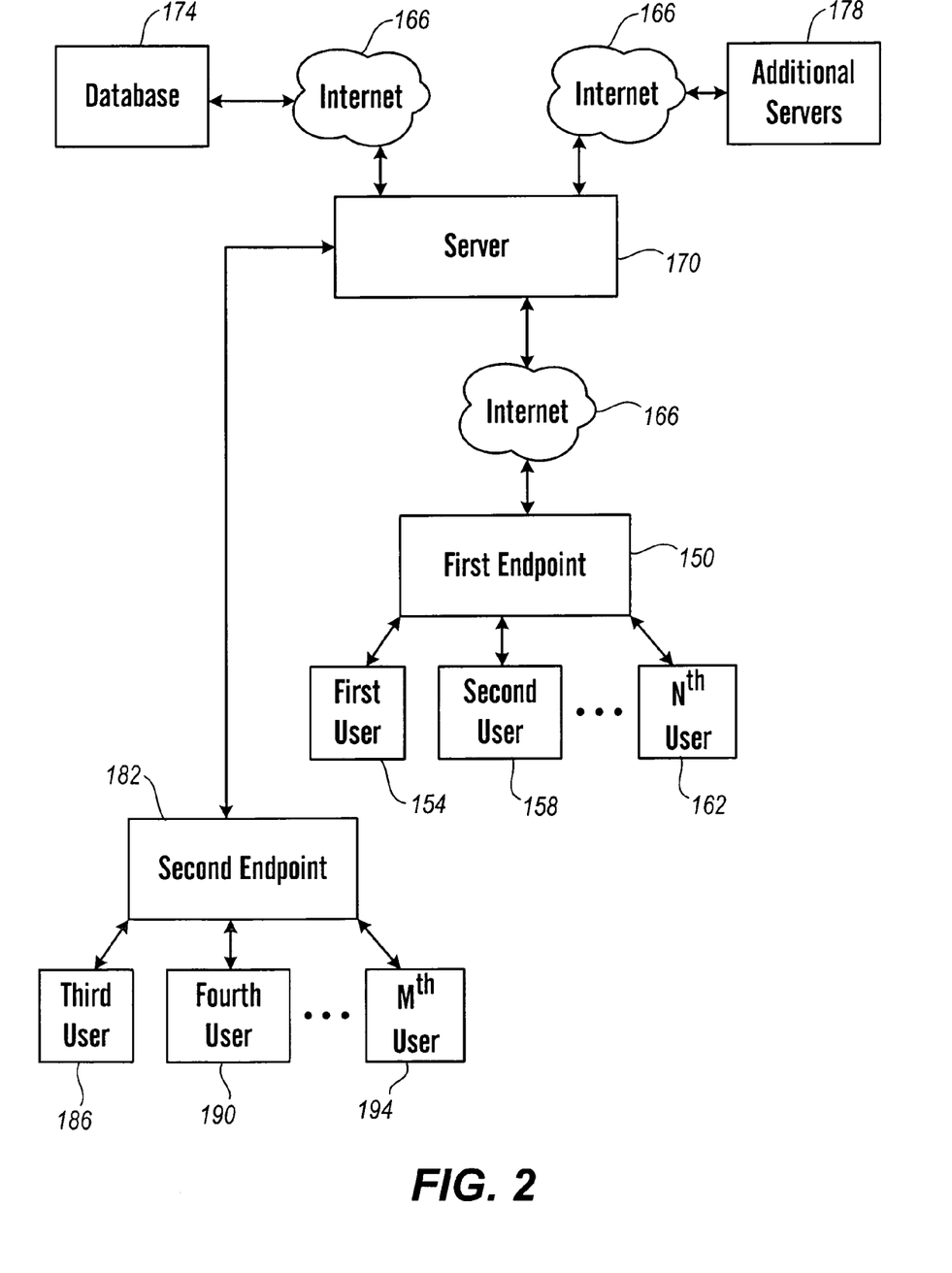
FIG. 2 is a block diagram illustration of one embodiment of a system of the present invention having multiple end users at an endpoint, and which utilizes the Internet for communications.

FIG. 2 is a block diagram illustration of one embodiment of a system of the present invention having multiple end users at an endpoint, and which utilizes the Internet for communications. In this embodiment, a first endpoint 150 has a number of users, including a first user 154, a second user 158, and additional users up to and including an Nth user 162. The first endpoint 150 connects to the Internet 166, and communicates with a server 170. Similar to the system described with respect to FIG. 1, the server 170 may communicate with a database 174 and additional servers 178. In the embodiment illustrated in FIG. 2, the server 170 communicates with the database 174 and additional servers 178 through the Internet 166. The system also has a second endpoint 182, which has a number of users including a third user 186, a fourth user 190, and additional users up to and including an Mth user. 194. The second endpoint 182 also communicates with the server 170 through the Internet 166. The first endpoint 150 and second endpoint 182 in this embodiment may, for example, represent telecommunications switches, which may be owned and operated by a single enterprise customer in an enterprise network. The enterprise network may be a switch based network, a server based network, or other type of network which allows communication between components and sites within the enterprise network.

The enterprise customer may have purchased a block of licenses which activate certain features in the first and second endpoints 150, 182. The total number of combined users at the endpoints 170, 182 is then limited to the total number of licenses purchased by the enterprise customer. As mentioned above, in certain instances the enterprise customer may need to transfer some or all of the licenses from the first endpoint 150 to the second endpoint 182, in order to enable the second endpoint 182 to support more users. In this embodiment, the server 170 may be accessed by the second endpoint 182 which requests a transfer of licenses from the first endpoint 150 to the second endpoint 182. Likewise, the server 170 may be accessed by the first endpoint 150 to request licenses be transferred to the second endpoint 182.

The server 170, in one embodiment, is operated by the manufacturer of the endpoints who also distributes the licenses allowing the end users to access features or software located at the endpoints. In another embodiment, the server 170 is operated by an distributor of telecommunications switches, who supplies switches to various customers. The distributor may have purchased a number of switches from the switch manufacturer, and a number of licenses from the switch manufacturer, which the distributor allocates to the different customers. In this embodiment, the customer may access the server 170 and request additional licenses from the distributor.

The server 170 determines availability of licenses, and communicates information to the endpoints 150, 182 which may adjust the number of available licenses at the endpoints 150, 182, thus changing the total number of licenses available for the users connected to each endpoint 150, 182. The communications between the endpoints 150, 182 and server 170 will be described in more detail below.

Figure 3:
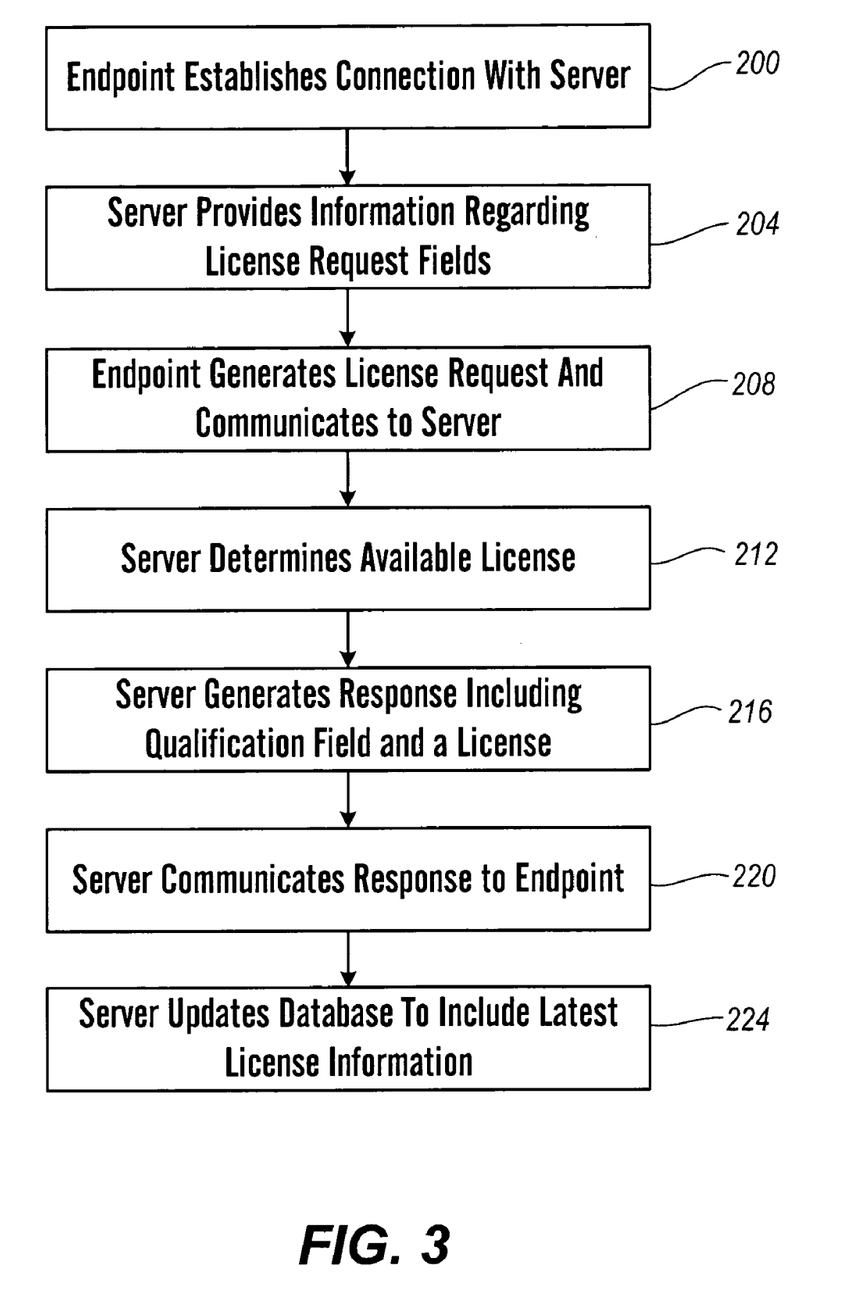
FIG. 3 is a flow chart diagram illustrating the general operational steps for license distribution between a server and an endpoint for one embodiment of the present invention.

Referring now to FIG. 3, a flow chart diagram illustrating the general operational steps for license distribution between a server and an endpoint for one embodiment of the present invention is described. Initially, as noted by block 200, the endpoint establishes a connection with the server. When establishing this connection, the endpoint, in one embodiment, accesses the server using an Internet connection and an http or https protocol. However, numerous other connections may be used to connect the endpoint and server, such as telephone, LAN, wireless, instant messaging, and cellular, among others as will be readily understood by one of skill in the art. Likewise, any communication protocol may be used, including proprietary protocols. When the endpoint establishes the connection with the server, the server provides information regarding license request fields, as noted at block 204. The endpoint receives this information, and populates the license request fields with the relevant information to generate a license request which is communicated to the server, according to block 208. The license request may have any of a number of structures, as will be described in more detail below.

The server receives the license request, and parses the information contained therein to determine the information in each of the license request fields, and determines the available license which may be provided to the endpoint, as noted by block 212. At block 216, the server generates a response which includes a qualification field and a license. The license may be a limited license, such as, for example, a one time copy license for digital content. The license may also be a software license which is then transferred from a first site within an enterprise to a second site within the enterprise. The second site would then have an additional license, and the first site would have one fewer licenses. In such a situation, the license request may also be for any number of licenses, allowing multiple software RTU licenses to be transferred between sites at any given time. The qualification field may be a separate field which is required by the software in order to enable the software. The qualification field may also be a decryption key which the endpoint may use to decrypt an encrypted signal which will enable to endpoint to copy content.

According to block 220, the server communicates the response to the endpoint, thus granting the license. The server then updates a database to include the latest license information, as noted by block 224. If there is an access failure at any point, the server can report the same result back to the endpoint following a license request which has the same information in the different fields. The endpoint may be a piece of hardware having a connection to the server, and may generate all of the transactions for the endpoint and receive the license automatically, or the information from the endpoint may be input by a user. It will be understood that numerous alternatives exist to the flow of the operational steps of FIG. 2. For example, the endpoint and server could communicate individual fields related to the license request rather than include the entire request in one structure. Furthermore, the server may communicate with additional servers when making any determinations regarding licenses which are available to the endpoint.

Figure 4:
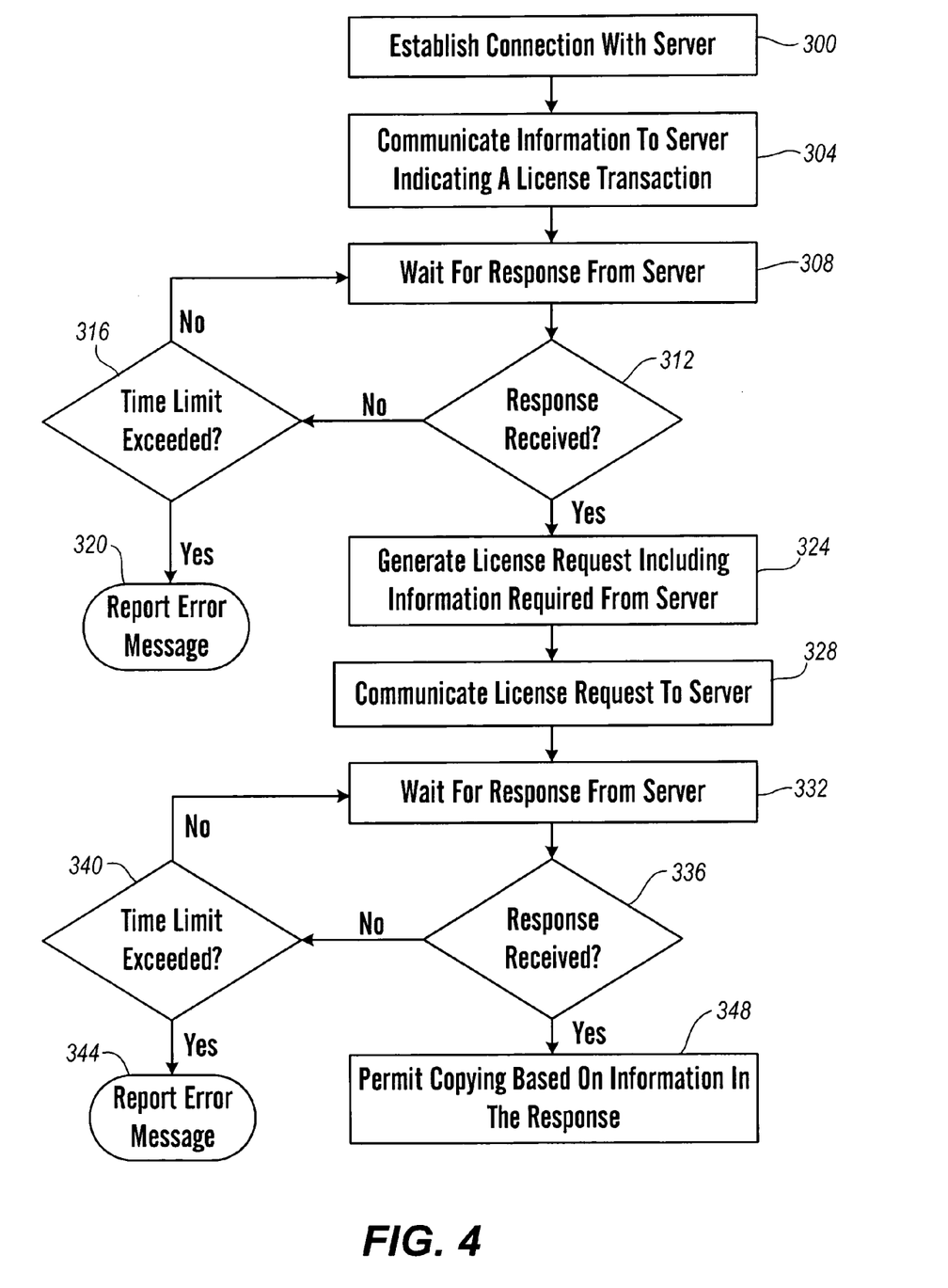
FIG. 4 is a flow chart diagram illustrating the operational steps performed by an endpoint for one embodiment of the present invention.

Referring now to FIG. 4, a more detailed flow diagram illustrating the operational steps performed by an endpoint for one embodiment of the present invention is now described. Similarly as mentioned above, the endpoint may perform the operational steps automatically following a command by a user, or a user may input information required for certain operational steps. For example, the endpoint may be a digital video disk (DVD) player, which is capable of both playing digital video disks and recording, or supplying a digital signal to a digital output which another device can connect to in order to record the digital output. The terms "record" or "copy" are used to refer to storage of information on a medium which may be used to view the stored information at a later time. If a user wants to copy a DVD, the user is required to give a copy command, following which the DVD player develops a license request and initiates communication with a licensing authority.

Initially, according to block 300, the endpoint establishes a connection with the server. The endpoint communicates information to the server indicating that it needs to perform a license transaction, as noted by block 304. The endpoint then waits for a response from the server, as noted by block 308. At block 312, the endpoint determines if a response from the server has been received. If a response has not been received, the endpoint determines if a time limit has been exceeded, according to block 316. If the time limit is exceeded, the endpoint reports an error message, as noted by block 320. If, at block 316, the time limit is not exceeded, the endpoint performs the functions of blocks 308 through 312 again. If the endpoint has received a response at block 312, a license request is generated including the information which is required by the server, as noted by block 324. The endpoint, according to block 328, communicates the license request to the server. The endpoint waits for a response from the server at block 332, and determines if a response has been received according to block 336. If a response has not been received from the server, the endpoint determines if a time limit has been exceeded, as noted by block 340. If the time limit has been exceeded, the endpoint reports an error message, as noted by block 344. If a response is received from the server at block 336, the endpoint parses the response and permits copying based on information in the response, as noted by block 348.

Figure 5:
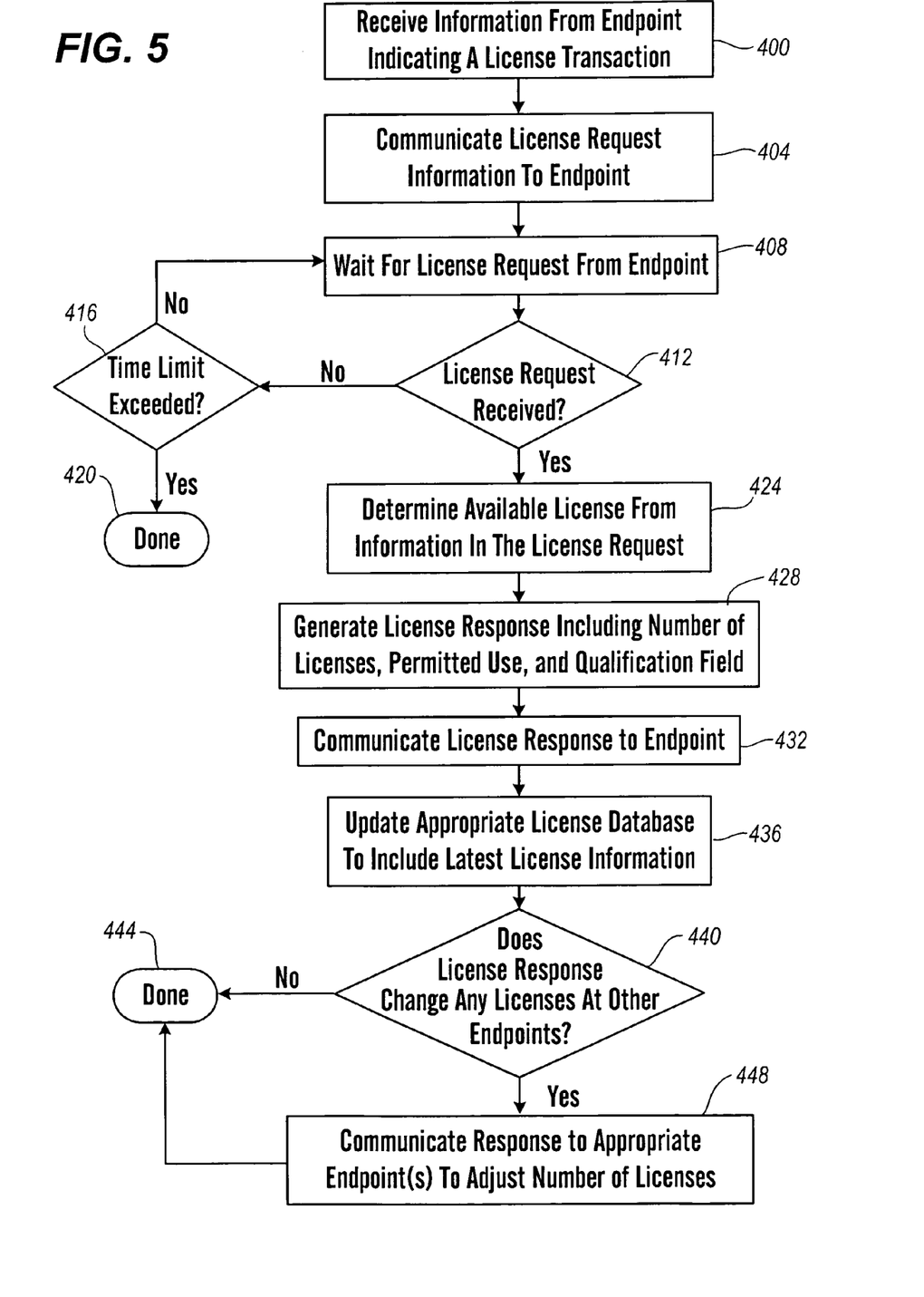
FIG. 5 is a flow chart diagram illustrating the operational steps performed by a server for one embodiment of the present invention.

Referring now to FIG. 5, a flow chart illustrating the operational steps performed by a server in one embodiment of the present invention is now described. Initially, at block 400, the server receives information from an endpoint indicating a license transaction is needed. The server, at block 404, communicates license request information to the endpoint. The server, according to block 408, waits for a license request from the endpoint. At block 412, the server determines if a license request has been received from the endpoint. If a license request has not been received, the server determines if a time limit has been exceeded, as noted by block 416. If the time limit has been exceeded, the server discontinues the operation, as noted by block 420. If the server determines that a license request has been received at block 412, the server parses the information in the license request and determines the availability of any licenses requested from the endpoint, as noted by block 424. At block 428, the server generates a license response including a number of licenses, which may include zero, the permitted use of the license, and a qualification field. The server communicates the license response to the endpoint at block 432. The server updates the appropriate license database to include the latest license information, as noted by block 436. The server then determines, at block 440, whether the license response results in any changes to the number of licenses at other endpoints. If the license response does not alter the number of licenses available at any other endpoints, the operation is terminated, as noted at block 444. If the license response does result in a change of licenses at another endpoint, the server communicates a response to the other endpoint(s) to adjust the number of licenses available, as noted at block 448. As will be understood by one of skill in the art, the operational steps described with respect to FIGS. 3-5 may be performed using either software or hardware.

Figure 6:
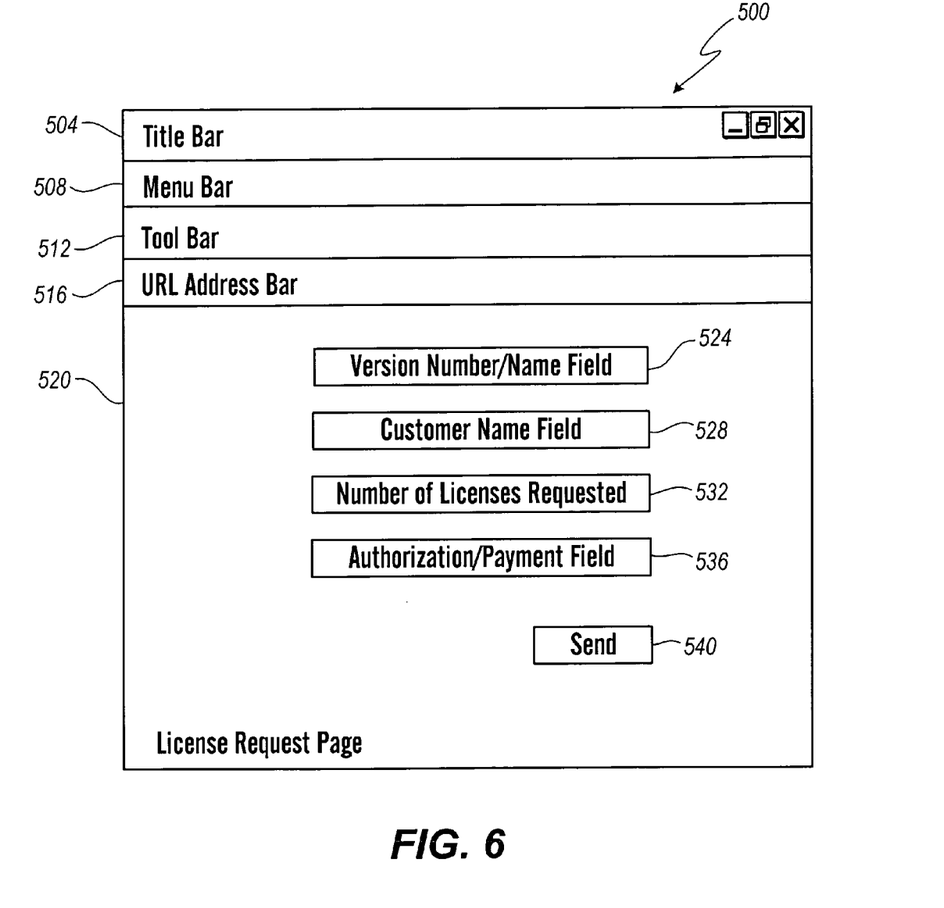
FIG. 6 is an illustration of a screen shot of a license request page of one embodiment of the present invention.

Referring now to FIG. 6, an illustration of a screen shot of a license request page of one embodiment of the present invention is described. The license request page 500 includes a title bar 504, a menu bar 508, a tool bar 512, and a URL address bar 516. Each of these bars 504-516 are well known and serve the standard functions of such bars. The license request page includes a content area 520, which includes a number of fields required for granting a license. A version number/name field 524 prompts for the entry of the version number of software the licenses are requested for, or for the name of the software or other content for which a license is being requested. A customer name field 528 prompts for the entry of the customer name. The customer name may be the name of an enterprise customer, or may be the name of an individual who wishes to copy multimedia content. A number of licenses requested field 532 prompts for the number of licenses requested by the user. This number may correspond to the number of additional software licenses required by one site in an enterprise network, or the number of copies requested by a multimedia content customer. An authorization/payment field prompts for an appropriate authorization, or for the proper payment required for granting a license. The authorization may include an access password for the user, and may also include credit card or personal check information. In one embodiment, the endpoint and server communicate using a secure transfer protocol, such as https, for security purposes. The content area 520 also includes a "send" button 540, which may be used to send the information included in the license request page to the server.

Figure 7:
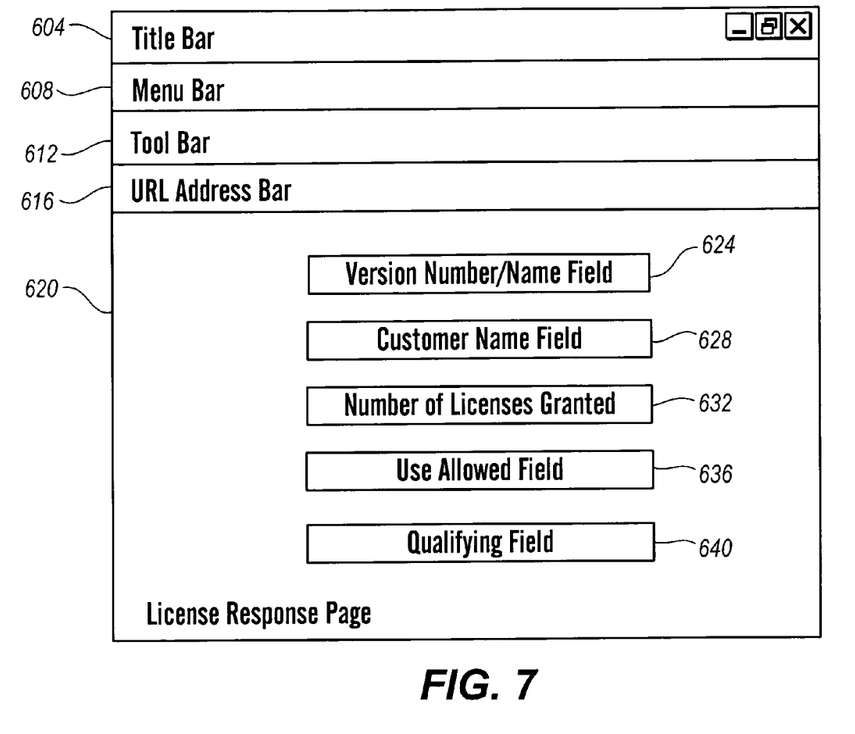
FIG. 7 is an illustration of a screen shot of a license response page of one embodiment of the present invention.

Referring now to FIG. 7, an illustration of a license response page of one embodiment of the present invention is described. The license response page 600 includes a title bar 604, a menu bar 608 a tool bar 612, and a URL address bar 616. Each of these bars 604-616 are well known and serve the standard functions of such bars. The license response page includes a content area 620, which includes a number of fields describing the license which is granted. A version number/name field 624 displays the version number of software the licenses are granted for, or for the name of the software or other content for which a license is granted. A customer name field 628 indicates the customer name. A number of licenses requested field 632 indicates the number of licenses which are granted based on the license request, including zero. A use allowed field 636 indicates the use allowed for the license. For example, if a customer is granted a license to copy video content from a HDTV broadcast, the use allowed field may indicate to the device used to copy the content that not all of the content may be copied. For example, if a broadcast of a television program includes additional digital content, such as biographical information for individuals in the program, the use allowed field 636 may indicate that only the video content may be copied, and that the additional digital content may not be copied.

A qualifying field 640 contains qualifying information which may be used by the endpoint to verify the validity of the license. The server generates the qualifying field based on an authentication algorithm which is based on as many of the fields as the provider wishes to use to generate a responding qualification field. The endpoint must receive a valid qualifying field in order to permit any change in licenses. The qualifying field 640 may also contain a decryption key, which would allow the endpoint to decrypt information related to the software or content associated with the license. The qualifying field 640 may be scrambled, or obscured by the device receiving the license response page, thus increasing the difficulty of unauthorized users accessing the qualifying field 640 and determining a system or formula which is used to generate the information contained in the qualifying field 640.

Figure 8:
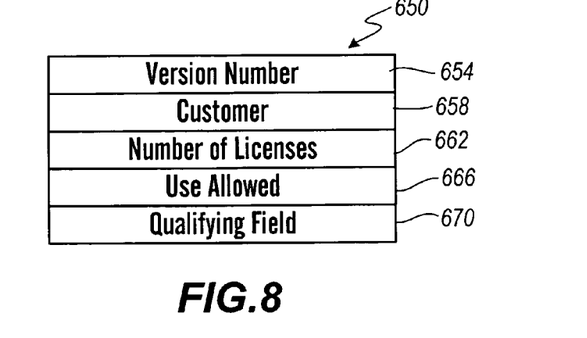
FIG. 8 is a block diagram illustration of the license structure of one embodiment of the present invention.

Referring now to FIG. 8, the license structure of one embodiment of the present invention is now described. As illustrated in FIG. 8, the license structure 650 has a number of information fields. A first field, the version number field 654 contains the version number, which may be in any format including a binary number string or a text string, and contains information identifying a product. For example, in an EWL application, the version number may indicate a specific software program and the version number of that program. Likewise, if the license is for digital media content, the version number field 654 may include information related to the title content and the date, such as "Movie X, director's version, May, 2000." The license structure 650 contains a customer field 658, which contains information related to a unique customer identifier.

A number of licenses field 662 contains information indicating the number of licenses being granted. This number may be the number of licenses allocated for a software program for a site, or may contain the total number of copies allowed to be made in a media application. A use allowed field 666 indicates any limited use for the license. For example, if a software application has an initial trial mode use, the use allowed will indicate that the use is a trial mode, and the period of the trial. The use allowed field 666 may also indicate that only portions of digital content may be copied. For example, a content provider may provide digital video content of an event, and additional digital information which is not required for a video image. The use allowed field may indicate that a copy of the digital video content may be copied, and that the additional digital information may not be copied. Finally, the license structure 650 contains a qualifying field 670, which may contain information for authentication/verification purposes. The license, upon being received at the endpoint, would either allow it to come into service based on the parameters or allow a function to be performed, such as copying of content.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for transferring a software license in an enterprise network, comprising:
   (a) allocating a first number of licenses to a first site;
   (b) allocating at least a second number of licenses to at least a second site, the at least a second site being geographically dislocated from the first site;
   (c) receiving a license reallocation request;
   (d) determining, independently of input from a user, at least one of (i) a third number of licenses for said first site and (ii) at least a fourth number of licenses for said at least a second site based on a total number of available licenses, said third number of licenses being different from said first number of licenses;
   (d1) accessing a database containing license allocation records to determine said first number and said second number;
   (d2) calculating a difference between said first number and a requested number of licenses in said reallocation request;
   (d3) determining an additional number of licenses required for said first site based on said calculating step (d2);
   (d4) determining said third number as the sum of said first number and said additional number of licenses; and
   (d5) determining said at least a fourth number by subtracting said additional number of licenses from said at least a second number;
   (e) communicating at least a first response to the first site, the at least a first response including said third number of licenses, and communicating at least a second response to the at least a second site, the at least a second response including said at least a fourth number of licenses; and
   (f) thereafter operating the first and second sites subject to the first site being entitled to the third number of licenses and the second site being entitled to the at least a fourth number of licenses.

2. The method for transferring a software license in an enterprise network, as claimed in claim 1, further comprising:
   updating a record indicating the third and at least a fourth number of licenses allocated to said first site and at least a second site, respectively.

3. The method for transferring a software license in an enterprise network, as claimed in claim 1, wherein said accessing step comprises:
   establishing communication with a server; and
   accessing the database on the server which contains said license allocation records.

4. The method for transferring a software license in an enterprise network, as claimed in claim 1, wherein said license reallocation request includes a request for additional licenses.

5. The method for transferring a software license in an enterprise network, as claimed in claim 1, wherein said first response includes a plurality of fields, including a version number field, a customer name field, a number of licenses granted field, a use allowed field, and a qualifying field.

6. The method for transferring a software license in an enterprise network, as claimed in claim 1, wherein said license reallocation request includes a plurality of fields including a version number field, a customer name field, a number of licenses requested field, and an authorization field.

7. The method for transferring a software license in an enterprise network, as claimed in claim 1, wherein said receiving and communicating steps are performed using hypertext transfer protocol.

8. The method for transferring a software license in an enterprise network, as claimed in claim 1, wherein said receiving and communicating steps are performed using hyper text transfer protocol over secure socket layer (HTTPS).

9. The method for transferring a software license in an enterprise network, as claimed in claim 2, wherein said updating a record step includes:
   accessing a database containing license records; and updating said records to indicate the third and at least a fourth number of licenses allocated to said first and said at least a second sites, respectively.

10. The method for transferring a software license in an enterprise network, as claimed in claim 9, wherein said accessing a database step comprises:
establishing communication with a server; and
accessing the database on the server which contains said license allocation records.

11. An apparatus for transferring a software license in an enterprise network, comprising:
a server operable to reallocate licenses upon receiving a license reallocation request from at least a first endpoint;
a database in communication with said server, operable to store license data and a total number of available licenses for an enterprise;
wherein, upon receiving said license reallocation request, said server is operable to access said database and determine, independently of input from a user, at least one of (i) a first number of licenses for the at least a first endpoint and (ii) at least a second number of licenses for at least a second endpoint based on said total number of available licenses, the at least first endpoint and the at least second endpoint being geographically dislocated, and said server is operable to communicate a first response to the at least first endpoint, the first response including said first number of licenses, and communicate at least a second response to the at least second endpoint, the at least a second response including said at least a second number of licenses, and wherein the at least a first and at least a second endpoints operate subject to the at least a first endpoint being entitled to the first number of licenses and the at least a second site being entitled to the at least a second number of licenses, wherein when making said determination said server is operable to:
access said database to determine a previous number of licenses allocated to said at least a first endpoint;
calculate a difference between said previous number of licenses and a requested number of licenses in said reallocation request;
determine an additional number of licenses required for said at least a first site based on said calculated difference; and
determine said first number as the sum of said previous number of licenses and said additional number of licenses.

12. The apparatus for transferring a software license in an enterprise network, as claimed in claim 11, wherein said server updates a record in said database indicating the first number and the at least second number of licenses allocated to said at least a first endpoint and at least second endpoint, respectively.

13. The apparatus for transferring a software license in an enterprise network, as claimed in claim 11, wherein said server is operable to:
establish communication with a database server; and
access the database on the database server which contains said license allocation records.

14. The apparatus for transferring a software license in an enterprise network, as claimed in claim 11, wherein said license reallocation request includes a request for additional licenses.

15. The apparatus for transferring a software license in an enterprise network, as claimed in claim 11, wherein said license reallocation request includes a plurality of fields including a version number field, a customer name field, a number of licenses requested field, and an authorization field.

16. The apparatus for transferring a software license in an enterprise network, as claimed in claim 11, wherein said server is operable to communicate with said database and the endpoints using hypertext transfer protocol.

17. The apparatus for transferring a software license in an enterprise network, as claimed in claim 11, wherein said server is operable to communicate with said database and the endpoints using hyper text transfer protocol over secure socket layer (HTTPS).

18. An apparatus for transferring a software license in an enterprise network, comprising:
a first endpoint and at least a second endpoint, each of said endpoints being operably interconnected to said enterprise network and wherein the first endpoint and at least a second endpoint are geographically dislocated and located, respectively, in a first site and at least a second site;
a server operably interconnected to said enterprise network, which is geographically dislocated from said first and said at least a second endpoints;
a database operably interconnected to said server, said database operable for storage and retrieval of license information related to said first site and at least a second site,
wherein said first endpoint is operable to receive a request to reallocate a number of licenses associated with the first site, and, upon receiving said requests, communicate a license reallocation information request to said server, and receive license reallocation information from said server in response to said license reallocation information request, and thereafter communicate a license reallocation request to said server, the server, upon receiving said license reallocation request, determines a revised number of licenses available to said first site and said at least a second site, communicates the revised license information including a revised number of licenses to each of said first and said at least a second endpoints, and the sites thereafter operate according to the revised number of licenses and wherein, receiving said license reallocation request, said server is operable to:
access said database to retrieve license allocation records related to said first and said at least a second sites, said license allocation records including a first number of licenses for said first site and at least a second number of licenses for said at least a second site;
calculate a difference between said first number and a requested number of licenses in said reallocation request;
determine an additional number of licenses required for said first site based on said calculated difference;
determine a third number as the sum of said first number and said additional number of licenses; and
determine at least a fourth number of licenses by subtracting said additional number of licenses from said at least a second number.

19. An apparatus for transferring a software license in an enterprise network, as claimed in claim 18, wherein said server is operable to update a record located in said database to indicate the revised number of licenses allocated to said first and at least a second sites, respectively.

20. An apparatus for transferring a software license in an enterprise network, as claimed in claim 18, wherein, when accessing said database, said server is operable to:

establish communication with a server; and
access the database on the server which contains said license allocation records.

21. An apparatus for transferring a software license in an enterprise network, as claimed in claim 18, wherein said license reallocation request includes a request for additional licenses.

22. An apparatus for transferring a software license in an enterprise network, as claimed in claim 18, wherein said license reallocation information includes a plurality of fields, including a version number field, a customer name field, a number of licenses granted field, a use allowed field, and a qualifying field.

23. An apparatus for transferring a software license in an enterprise network, as claimed in claim 18, wherein said license reallocation request includes a plurality of fields including a version number field, a customer name field, a number of licenses requested field, and an authorization field.

24. An apparatus for transferring a software license in an enterprise network, as claimed in claim 18, wherein said server is operable to communicate to said endpoints using hypertext transfer protocol.

25. An apparatus for transferring a software license in an enterprise network, as claimed in claim 18, wherein said server is operable to communicate to said first and at least a second endpoints using hypertext transfer protocol over secure socket layer (HTTPS).

* * * * *